(12) United States Patent
Woehl et al.

(10) Patent No.: US 8,465,967 B2
(45) Date of Patent: Jun. 18, 2013

(54) NANOPARTICLE ELECTROSTATIC TRAP

(75) Inventors: Jorg C. Woehl, Bayside, WI (US); Christine A. Carlson, Brown Deer, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 99 days.

(21) Appl. No.: 13/011,413

(22) Filed: Jan. 21, 2011

(65) Prior Publication Data

US 2011/0180701 A1    Jul. 28, 2011

Related U.S. Application Data

(60) Provisional application No. 61/336,449, filed on Jan. 22, 2010.

(51) Int. Cl.
| | | |
|---|---|---|
| *C12M 1/00* | (2006.01) | |
| *B01D 21/00* | (2006.01) | |
| *B01D 59/44* | (2006.01) | |
| *B05D 5/12* | (2006.01) | |

(52) U.S. Cl.
USPC ............. 435/283.1; 435/288.5; 422/527; 250/282; 427/459

(58) Field of Classification Search
USPC ............. 435/283.1, 285.2; 422/527; 250/282; 427/459
See application file for complete search history.

(56) References Cited

U.S. PATENT DOCUMENTS

| | | | |
|---|---|---|---|
| 2007/0080062 A1* | 4/2007 | Harnett et al. | 204/450 |
| 2011/0031389 A1* | 2/2011 | Reed et al. | 250/282 |

OTHER PUBLICATIONS

Bezryadin et al "Electrostatic trapping of single conducting nanoparticles between nanoelectrodes" Appl. Phys. Lett. 1997, 71: 1273-1275.*
Amjadi, A. et al., "A liquid film motor," Microfluid. Nanofluid. (2009) 6: 711-715.
Ashkin, A. et al., "Observation of a single-beam gradient force optical trap for dielectric particles," Opt. Lett. (1986) 11: 288-290.
Ashkin, A. and Dziedzic, J.M., "Optical trapping and manipulation of viruses and bacteria," Science. (1987) 235: 1517-1520.
Ashkin, A. "Acceleration and trapping of particles by radiation pressure," Phys. Rev. Lett. (1970) 24: 156-159.
Baker-Jarvis, J. et al., "Ion Dynamics near Charged Electrodes with Excluded Volume Effect," IEEE T. Dielect. El. In. (1999) 6: 226-235.
Bazant, M.Z. et al., "Nonlinear electrokinetics at large voltages," New J. Phys. (2009) 11: 075016-1-9.

(Continued)

*Primary Examiner* — Betty Forman
(74) *Attorney, Agent, or Firm* — Michael Best & Friedrich LLP

(57) ABSTRACT

A method of trapping a charged particle. The method includes providing a planar substrate having a conductive surface thereon, the conductive surface having at least one non-conductive region. The method also includes applying a solution to the conductive surface, the solution comprising at least one charged particle. The method further includes applying a voltage of a threshold level to the conductive surface. The method also includes, in response to the voltage, generating an electrostatic field in the solution adjacent to a boundary between the conductive surface and the non-conductive region. The method also includes setting the threshold level of voltage to result in a strength of the electrostatic field sufficient to prevent the particle from crossing the electrostatic field.

10 Claims, 8 Drawing Sheets

OTHER PUBLICATIONS

Berry, R.M. and Berg, H.C. Berg, "Absence of a barrier to backwards rotation of the bacterial flagellar motor demonstrated with optical tweezers," Proc. Natl. Acad. Sci. Unit. States. Am. (1997) 94: 14433-14437.

Betzig, E. et al., "Imaging Intracellular Fluorescent Proteins at Nanometer Resolution," Science (2006) 313: 1642-1645.

Bhuiyan, L.B. and Outhwaute, C.W., "Comparison of exclusion volume corrections to the Poisson-Boltzmann equation for inhomogeneous electrolytes," J. Colloid Interface Sci. (2009) 331: 543-547.

Biteen, J.S. and Moerner, W.E., "Single-Molecule and Superresolution Imaging in Live Bacteria Cells". Cold Spring Harbor Perspect. Biol. (2010) 2: a000448-1-14.

Borukhov, I. et al., "Steric Effects in Electrolytes: A Modified Poisson-Boltzmann Equation," Phys. Rev. Lett. (1997) 79: 435-438.

Carlson, C.A. and Woehl, J.C., "Fabrication of optical tips from photonic crystal fibers," Rev. Sci. Instrum. (2008) 79: 103707-1-5.

Carlson, C.A. and Woehl, J.C., "The corral trap: fabrication and software development," Proc. SPIE (2010) 7571: 757108-1-6.

Carlson, C.A. and Woehl, J.C., "Improved corral trap fabrication and microfluidic device integration," Proc. SPIE (2011) 7908: 790804-1-5.

Chou, C.-F. et al., "Electrodeless Dielectrophoresis of Single- and Double-Stranded DNA," Biophys. J. (2002) 83, 2170-2179.

Cohen, A.E. and Moerner, W.E. "Suppressing Brownian motion fo individual biomolecules in solution," Proc. Natl. Acad. Sci. Unit. States. Am. (2006) 103: 4362-4365.

Cohen, A.E. and Moerner, W.E. "Method for trapping and manipulating nanoscale objects in solution" Appl. Phys. Lett. (2005) 86: 093109-1-3.

Fields, A.P. and Cohen, A.E., "Electrokinetic trapping at the one nanometer limit," Proc. Natl. Acad. Sci. USA (2011) 108, 8937-8942.

Finer, J.T. et al., "Single myosin molecule mechanics: piconewton forces and nanometre steps," Nature (1994) 368: 113-119.

Giljohann, D.A. and Mirkin, C.A., "Drivers of biodiagnostic development," Nature (2009) 462: 461-464.

Gosse, C. and Croquette, V., "Magnetic tweezers: micromanipulation and force measurement at the molecular level," Biophys. J.(2001) 80: 531.

Gould, T.J. et al., "Imaging biological structures with fluorescence photoactivation localization microscopy," Nature Protocols (2009) 4: 291-308.

Grier, D.G. "A revolution in optical manipulation" Nature. (2003) 424: 810-816.

Guan, W. et al., "Paul trapping of charged particles in aqueous solution," Proc. Natl. Acad. Sci. USA (2011) 108, 9326-9330.

Hansen, P.M. et al., "Expanding the Optical Trapping Range of Gold Nanoparticles," Nano Lett. (2005) 5: 1937-1942.

Hayward, R.C. et al., "Electrophoretic assembly of colloidal crystals with optically tunable micropatterns," Nature (2000) 404: 56-59.

Hess, S.T. et al., "Ultra-High Resolution Imaging by Fluorescence Photoactivation Localization Microscopy," Biophys. J. (2006) 91: 4258-4272.

Hoggard, J.D. et al., "Electrolyte-Dependent Pairwise Particle Motion near Electrodes at Frequencies below 1 kHz," Langmuir (2007) 23: 6983-6990.

Hölzel, R. et al., "Trapping Single Molecules by Dielectrophoresis," Phys. Rev. Lett. (2005) 95: 128102-1-4.

Hosokawa, H. et al., "Optical assembling dynamics of individual polymer nanospheres investigated by single-particle fluorescence detection," Physical Review (2004) E70: 06140-1-7.

Johnson, P.H. et al., "Electrophoresis of DNA in agarose gels: Optimizing separations of conformational isomers of double- and single-stranded DNAs," Biochem. (1977) 16: 4217-4225.

Jones, T.B., "Electromechanics of particles," (Cambridge University Press, 1995).

Krishnan, M., et al., "Geometry-induced electrostatic trapping of nanometric objects in a fluid" Nature (2010) 467: 692-695.

Kulzer, F. and Orrit, M., "Single-molecule optics," Annu. Rev. Phys. Chem. (2004) 55: 585-611.

Moerner, W.E. "A dozen years of single-molecule spectroscopy in physics, chemistry, and biophysics," J. Phys. Chem. B (2002) 106: 910-927.

Moerner, W.E. and Fromm, D.P., "Methods of single-molecule fluorescence spectroscopy and microscopy," Rev. Sci. Instrum. (2003) 74: 3597-3619.

Morrow, K. J., et al., "Recent Advances in Basic and Clinical Nanomedicine," Med. Clin. N. Am. (2007) 91: 805-843.

Neuman, K.C. and Block, S.M., "Optical Trapping," Rev. Sci. Instrum. (2004) 75(9): 2787-2809.

Novotny, L. et al., "Theory of Nanometric optical tweezers," Phys. Rev. Lett. (1997) 79: 645-648.

Patterson, G. et al., "Superresolution Imaging using Single-Molecule Localization." Annu. Rev. Phys. Chem. (2010) 61: 345-367.

Riehemann, K., et al., "Nanomedicine—Challenge and Perspectives," Angew. Chem. Int. Ed. (2009) 48: 872-897.

Ristenpart, W.D. et al., "Electrohydrodynamic Flow and Colloidal Patterning near Inhomogeneities on Electrodes," Langmuir (2008) 24: 12172-12180.

Rohrbach, A. "Stiffness of optical traps: quantitative agreement between experient and electro magnetic theory," Phys. Rev. Lett. (2005) 95: 168102-1-4.

Rust, M.J. et al., "Sub-diffraction-limit imaging by stochastic optical reconstruction microscopy (STORM)," Nat. Methods (2006) 3: 793-796.

Sastry, M., "Assembling nanoparticles and biomacromolecules using electrostatic interactions," Pure Appl. Chem. (2002) 74: 1621-1630.

Schmidt, T. et al., "Imaging of single molecule diffusion," Proc. Natl. Acad. Sci. USA (1996) 93: 2926-2929.

Shi, J. and Qin, X.R., "Formation of glass fiber tips for scanning near-field optical microscopy by sealed-and open-tube etching." Rev. Sci. Instrum. (2005) 76: 013702-1-5.

Shushkevich, G.CH., "Electrostatic problem for a torus placed in an infinite cylinder," Technical Physics. (2004) 49: 540-544.

Solomentsev, Y. et al., "Particle Clustering and Pattern Formation during Electrophoretic Deposition: A Hydrodynamic Model," Langmuir (1997) 13: 6058-6068.

Tanyeri, M., et cl., "Hydrodynamic trap for single particles and cells," Appl. Phys. Lett. (2010) 96, 224101-3.

Tamarat, P. et al., "Ten years of single-molecule scpectroscopy," J. Chem. Phys. (2002) 117: 10938-10946.

Trau, M.et al., "Assembly of Colloidal Crystals at Electrode Interfaces," Langmuir (1997) 13: 6375-6381.

Tuukkanen, S. et al., "Trapping of 27 bp-8 kbp DNA and immobilization of thiolmodified DNA using dielectrophoresis," Nanotechnology (2007) 18: 295204-1-10.

Voldman, J. et al., "Holding forces of single-particle dielectorphoretic traps," Biophys. J. (2001) 80: 531-541.

Wang, M.D. et al., "Stretching DNA with Optical Tweezers," Biophys. J. (1997) 72: 1335-1346.

Woehl, J.C., "Comparison of algorithms for the trapping of single molecules in an electrostatic corral," Proc. SPIE (2011) 7905: 79050A-1-7.

Xi, N. and Li, W.J., "Recent Development in Nanoscale Manipulation and Assembly," IEEE Trans. Autom. Sci. Eng. (2006) 3: 194-198.

Ying, L., et al., "Frequency and Voltage Dependence of the Dielectrophoretic Trapping of Short Lengths of DNA and dCTP in a Nanopipette," Biophys. J. (2004) 86: 1018-1027.

Zemanek, P. et al., "Optical trapping of Rayleigh particles using Gaussian standing wave," Opt. Commun. (1998) 151: 273-285.

Zemanek, P. et al., "Optical trapping of nanoparticles and microparticles by a Gaussian standing wave," Opt. Lett. (1999) 24: 1448-1450.

Zheng, L. et al., "Electronic manipulation of DNA, proteins, and nanoparticles for potential circuit assembly," Biosens. Bioelectron. (2004) 20, 606-619.

Zondervan, R.et al., "Photoblinking of Rhodamine 6G in Poly(vinyl alcohol): Radical Dark State Formed through the Triplet," J. Phys. Chem. A (2003) 107: 6770-6776.

\* cited by examiner

NANOPARTICLE ELECTROSTATIC TRAP

CROSS REFERENCE TO RELATED APPLICATION

This application claims the benefit of U.S. Provisional Application No. 61/336,449, filed Jan. 22, 2010, the content of which is incorporated herein by reference in its entirety.

FEDERALLY SPONSORED RESEARCH AND DEVELOPMENT

This invention was made with government support under grants no. CHE-0820832 and CHE-0723002 awarded by the National Science Foundation. The government has certain rights in the invention.

TECHNICAL FIELD

The present invention relates to methods and apparatus for trapping charged particles or molecules.

BACKGROUND

The manipulation of nanoscale objects is one of the great outstanding challenges for the fabrication of nanosensors and nanodevices that will drive future technologies. Precise control over single molecules, in particular, will impact a number of areas of intense research interest. For example, it will enable the planned (as opposed to purely heuristic) assembly of molecular-scale devices, revolutionize single molecule characterization techniques where short dwell times in the observation volume are the main obstacle, and lead to new tools for biomedical diagnosis with single molecule sensitivity. Any such manipulation must be preceded by an efficient, reliable method for confining (trapping) an object on demand.

SUMMARY

In one embodiment, the invention provides a method of trapping a charged particle. The method includes providing a planar substrate having a conductive surface thereon, the conductive surface having at least one non-conductive region. The method also includes applying a solution to the conductive surface, the solution comprising at least one charged particle. The method further includes applying a voltage of a threshold level to the conductive surface. The method also includes, in response to the voltage, generating an electrostatic field in the solution adjacent to a boundary between the conductive surface and the non-conductive region. The method also includes setting the threshold level of voltage to result in a strength of the electrostatic field sufficient to prevent the particle from crossing the electrostatic field.

In another embodiment the invention provides a method of manufacturing an electrostatic trap. The method includes providing a substrate and applying a conductive surface to the substrate. The method also includes creating a non-conductive region on the conductive surface. The method further includes applying a solution to the conductive surface, the solution comprising at least one charged particle. The method also includes applying a threshold level of voltage to the conductive surface. The method further includes, in response to the voltage, generating an electrostatic field in the solution adjacent to a boundary between the conductive surface and the non-conductive region. The method also includes setting the threshold level of voltage to result in a strength of the electrostatic field sufficient to prevent the particle from crossing the electrostatic field.

In yet another embodiment the invention provides a method of trapping a charged particle. The method includes providing a planar substrate having a conductive surface thereon, the conductive surface having a circular non-conductive region. The method also includes applying a solution to the conductive surface, the solution comprising at least one charged particle, wherein the solution has a thickness equal to no more than one-fifth of the radius of the circle. The method further includes applying a voltage to the conductive surface such that an electrostatic field is generated in the solution adjacent to a boundary between the conductive surface and the non-conductive region, wherein if the at least one charged particle is within the circle when the voltage is applied, the at least one charged particle is trapped within the circle, wherein the voltage applied to the conductive surface has the same polarity as the at least one charged particle.

Other aspects of the invention will become apparent by consideration of the detailed description and accompanying drawings.

DETAILED DESCRIPTION

Figure 1:
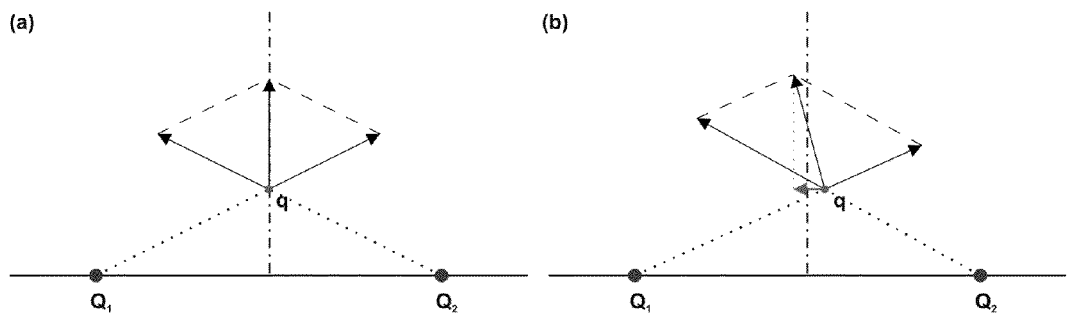
FIGS. 1(a) and 1(b) show the concept of the corral trap as illustrated using a one-dimensional analog.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Disclosed herein is the fabrication and use of a two-dimensional trap which can be used to trap single molecules as well as micro- and nanoscale particles free in solution. The trapping method utilizes pure electrostatic forces in order to confine the position of a trapped particle. The trap operates by creating a static well in the potential energy surface, creating an electrostatic 'corral'. An individual corral trap can be used for simultaneous trapping of multiple nanoparticles, which extends the range of potential applications, e.g., to the study of single molecule interactions or chemical reactions between single molecules.

Optical fluorescence imaging of single molecules has proven to be a powerful tool for the study of the individual behavior of biomolecules, which is often obscured by ensemble averaging. Single molecule studies span the areas of enzymatic fluctuations, diffusion analysis, protein/RNA folding, DNA processing, DNA sequencing, cellular entry, and have provided new insight into a variety of other biological phenomena.

The timescale of single molecule experiments is often limited to the diffusion of the molecule through the illumination volume, as in fluorescence correlation spectroscopy (FCS), or relies on the isolation of the molecule through surface immobilization in order to provide for longer observation times. Lifting these restrictions would allow for the study of a single molecule in a more natural environment, such as free in solution. Studies along these lines could give greater insight into the molecule's reaction to changes in its local environment or its affinity for other molecules in the solution. A great deal of effort has been directed towards the trapping of ever-smaller particles, the ultimate limit being that of a single molecule.

The corral trap is a two-dimensional trap that uses pure electrostatic forces to confine the position of a trapped nanoparticle. In contrast to other methods, trapping does not depend on information on particle location and does not require a complex feedback loop, but relies solely on the creation of a static well in the potential energy surface: the electrostatic corral. Also, unlike other trapping methods, the corral trap is capable of trapping a single molecule and allows for the simultaneous trapping of multiple nanoparticles, which extends its range of potential applications to the study of interactions or chemical reactions between single molecules.

This new approach to particle trapping was inspired by the formation of an electrostatic potential just above the plane of a circular charge distribution. At the center of this charge corral all electrostatic forces acting on the particle cancel out due to symmetry. However, if the particle is deviated within the plane, a net restoring force appears, which is directed towards the center position. The same principle applies to a particle located out of plane of the charge corral. The difference here is that the particle will now experience a net force that also has an axial component. If the particle is located on the two-fold axis of symmetry of the charge corral, the net Coulomb force acting on the particle has no lateral component. However, an in-plane displacement of the particle breaks the symmetry of the system, which in turn leads to the creation of a lateral force component that pulls the particle back towards the axis of symmetry (restoring force).

The electrostatic potential of such a charge distribution is a simple superposition of Coulomb potentials and depends only on relative distances (conveniently expressed as multiples of the radius of the charge corral). Such a charge geometry generates an axiosymmetric, corral-shaped potential well. Simple calculations reveal that the height of the potential barrier is a function of the distance from the charge corral and decreases with increasing axial distance; the corral disappears altogether beyond an axial distance of about 70% of the trap radius. Therefore, the axial confinement of the sample solution is an important design parameter for experimental setups.

In practice, such a charge distribution has been realized through the micropatterning of a thin metal film with circular holes on a glass substrate. When the film is charged, the metal rim surrounding the holes exhibits a very high surface charge density due to the small surface curvature, thus mimicking the intended charge geometry. This micropatterned metal film can be produced through several methods, which include simple shadow evaporation, focused ion beam milling, and lithographic techniques.

In its original form the corral trap has been fabricated using the shadow evaporation method. In addition, the solution of particles to be trapped was "sandwiched" between the micropatterned metal film and another coverslip to restrict the particles' axial movement to within the distance necessary for successful trapping. Although this method of trap fabrication produced traps capable of capturing single molecules as well as of other micro- and nanoscale particles free in solution, its future as an analytical device relies on more precise control over several parameters, including trap placement and axial confinement of the particle to be trapped.

Disclosed herein is an improved fabrication method, which allows for the systematic, predetermined placement of patterns of corral traps. In addition, we describe in greater detail the integration of the corral trap into a microfluidic cell, which leads to improved control over the axial confinement and opens up many possible applications for the use of corral traps in biomedical analysis.

As described herein, an electrostatic trap or corral is generated by first applying a conductive surface to a substrate, where the conductive region is patterned to have at least one non-conductive region. A solution having at least one charged particle is applied to the substrate and conductive surface. Next, a voltage of a threshold level is applied to the conductive surface. In response to the voltage, an electrostatic field is generated in the solution adjacent to a boundary between the conductive surface and the non-conductive region. The threshold level of voltage is set so as to result in a strength of the electrostatic field being sufficient to prevent the particle from crossing the electrostatic field.

The substrate is generally a planar, non-conductive material, although a rod or glass fiber having a conductive coating on its outer surface can also be used for electrostatic trapping. The substrate is typically translucent so as to facilitate observation of the trap region and any trapped particle(s) using optical microscopy methods such as those disclosed herein. Possible substrates include glass or quartz microscope slides or coverslips as well as materials such as PDMS (polydimethoxysilane). Nevertheless, non-transparent, non-conductive substrates such as silicon can also be used. In the case of non-transparent substrates, the observation of the specimen could be made through an objective "from the top."

The conductive surface is generally a metal that is applied to the substrate by evaporation, e.g. in a vacuum or semi-vacuum environment. In various embodiments, evaporated metals include Ni—Cr, Au, Au—Pd, Al, and indium-tin-oxide (ITO). The metal can be evaporated onto the substrate to various thicknesses, ranging from about 1 nm to about 10 nm, including about 2 nm, about 3 nm, about 4 nm, about 5 nm, about 6 nm, about 7 nm, about 8 nm, or about 9 nm. Furthermore, the thickness of the conductive surface can also be less than 1 nm or more than 10 nm, more than 100 nm, more than 1 μm, or more than 10 μm.

In some embodiments the non-conductive region can be made by first applying a removable object (e.g. bead, tube, or other object) to the substrate prior to evaporation of the metal such that the object leaves a shadow of uncoated (and hence non-conductive) substrate when the object is subsequently removed. In other embodiments the substrate can be completely covered with evaporated metal and non-conductive regions created by removal of metal from certain regions by techniques such as focused ion beam milling (see Examples). In another embodiment, the non-conductive region can be created by first structuring a resist using electron beam lithography or optical lithography that can then be used as a mask to create the patterned metal film. Various shapes of non-conductive regions can be made using these techniques, where the non-conductive region is generally a closed geometric shape such as a closed curve or polygon. In various embodiments the shapes can include circles, ovals, squares, triangles, rectangles, or other regular or irregular shapes, and a given substrate can incorporate one or more shapes or combinations of shapes. Dimensions of the non-conductive regions can range from 250 μm across (e.g. diameter for a circle or length of an edge of a square or rectangle) down to a few nanometers or angstroms.

A lead, e.g. a gold or copper wire, is attached to the conductive surface and connected to a power supply. The power supply is configured to supply a range of voltages, e.g. from −500 volts to +500 volts in varying increments of 0.1 V, 1 V, 5 V, 10 V or other increments as needed. The voltage can be switched on and off quickly, either manually or under computer control, thereby turning the electrostatic trap on and off quickly, giving a high degree of control to the trapping process. A voltage of the correct polarity is applied to activate the trap and to either trap a particle in the trap (if the particle is adjacent to the non-conductive region when the trap is activated) or to prevent the particle from entering the trap. The voltage needed to prevent a charged particle from crossing the electrostatic field (keeping the particle from either entering or leaving the trap) is a function of the amount of charge on the particle, the size and mass of the particle, and the viscosity, ionic strength, and flow velocity of the solution, among other factors.

A solution having at least one charged particle is applied to the conductive surface and substrate. The solution can be water or a solution containing any one or more salts, sugars, proteins, nucleotides, or other organic or inorganic materials. The solution may also contain one or more charged particles including beads made of latex, polystyrene, or other materials, having one or more charged groups thereon. The beads may be varying sizes from a few nanometers to 10 micrometers or more and may have fluorescent labels or other groups attached. Other charged molecules may also be trapped, such as single-stranded DNA (ssDNA, see Examples). In general, a larger voltage is needed to trap a particle with fewer charges on it. Alternatively, using the same voltage a smaller trap size (smaller non-conductive region) can be used to trap a particle having fewer charges.

The polarity of the voltage applied to the conductive layer is generally the same as the charge on the particle to be trapped, i.e. a negative voltage (e.g. −10 v) might be applied to trap a negatively-charged particle.

When the non-conductive region is circular, the layer of solution on the substrate is generally adjusted to about one-fifth the radius. Thus if the radius is 10 μm then the thickness of solution is about 2 μm to prevent the charged particle from escaping out the top while the trap is activated.

In various embodiments, the substrate may include a microfluidic chamber for transfer of fluid from one region of the substrate to another, for example to move fluid and charged particles through the trap region. The microfluidic chamber may have one or more of various shapes, e.g. linear, curved, branched, and the substrate may include one or more inlet and one or more outlet to the microfluidic chamber. Methods for construction of a microfluidic chamber suitable for use with the electrostatic trapping methods disclosed herein are described below in the Examples.

In some embodiments, the process of trapping particles can be automated (see below), which can be used to facilitate simultaneous trapping of more than one particle within a single corral.

The concept of the corral trap is illustrated using the one-dimensional analog shown in FIGS. 1(a) and 1(b). Imagine two identical, positive charges, $Q_1$ and $Q_2$, with fixed spatial positions acting on a free particle that carries a positive charge, q. If the particle is located on the twofold axis of symmetry between $Q_1$ and $Q_2$ (the perpendicular bisector of $Q_1Q_2$), it can easily be seen that, for reasons of symmetry, the net Coulomb force repelling q from the fixed charges has no lateral component (null position). A lateral displacement of the particle, however, breaks the symmetry and leads to a lateral force component that pulls the particle back to the null position, provided that it is sufficiently close to the fixed charges (which can be enforced by restricting particle movement in the axial direction). This lateral restoring force gradually increases with increasing lateral displacement, then decreases and finally changes direction, repelling the particle away from the null point.

In the symmetric case shown in FIG. 1(a), the force exerted by two identical fixed charges Q1 and Q2 on the charge q does not have any lateral component (null position). A small lateral displacement of the charge as shown in FIG. 1(b), however, leads to a restoring force with a lateral component (red arrow) that pulls the particle back to the null position.

This one-dimensional trap can be made into a two-dimensional trap by simple rotation about the axis of symmetry. The two fixed charges are thus transformed into a homogeneously charged circle located in the horizontal plane, which has the same effect on a charge q that is located close to the axis of symmetry in proximity to the fixed charge distribution. Experimentally, such a configuration can be realized by patterning a thin metal film with circular holes on a glass substrate. When the metal film is charged, the metal rim around such a hole exhibits a very high surface charge density due to the large surface curvature (tip effect). This concentration of charges along the rim thus mimics the intended charge geometry.

Figure 2:
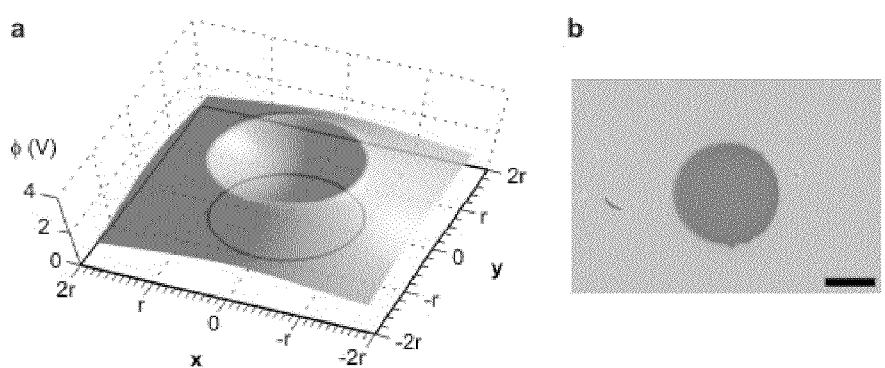
FIGS. 2(a) and 2(b) show an electrostatic corral.

FIGS. 2(a) and 2(b) show an electrostatic corral. FIG. 2(a) shows a vacuum electrostatic potential, Φ, above a stationary, circular charge distribution (black ring in the xy plane; linear charge density: 0.3 e/nm; radius r) at z=r/5. FIG. 2(b) shows a scanning electron micrograph of a 10 μm hole in a thin film of 60-40 Au—Pd on silica substrate (scale bar: 5 μm). Applying an electric potential to the film leads to the desired charge geometry.

Figure 3:
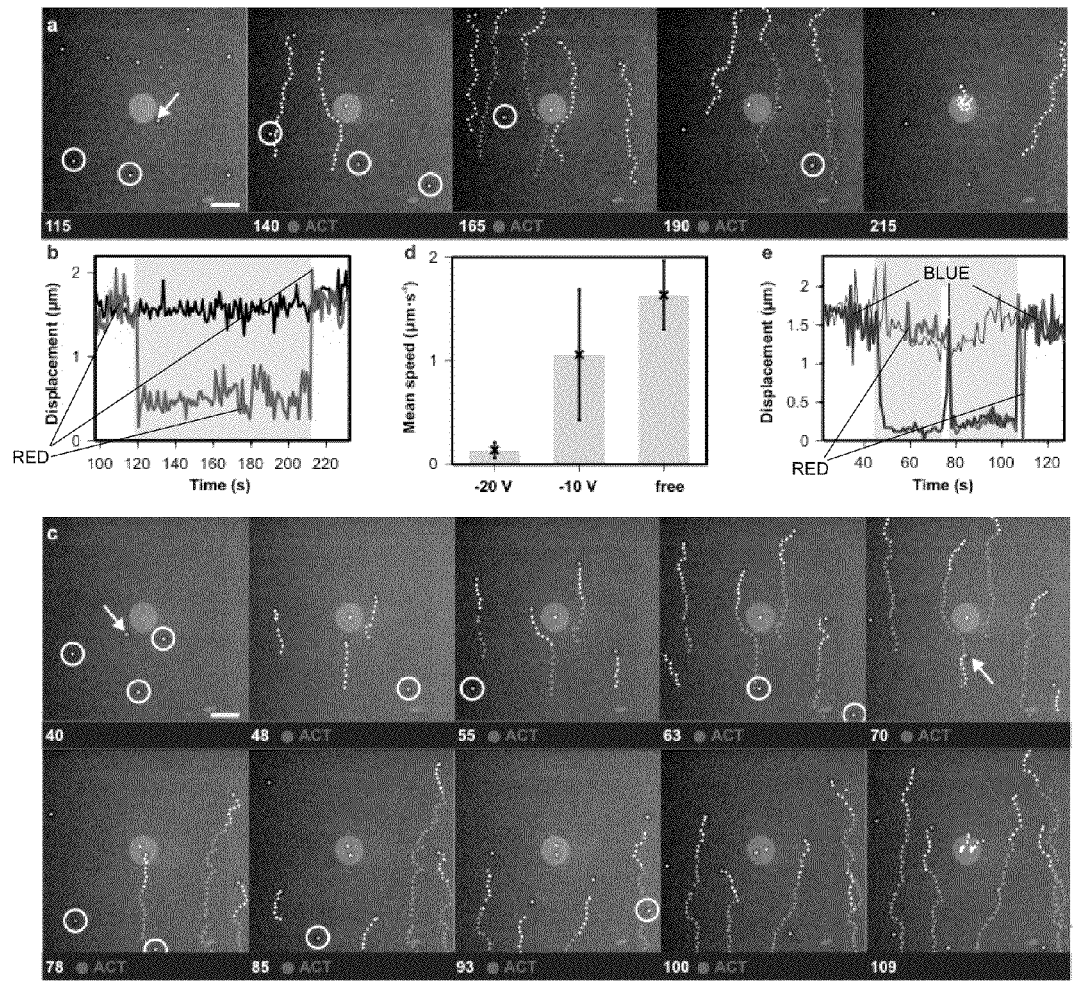
FIGS. 3(a)-3(e) show trapping of negatively charged 2 μm polystyrene spheres in a corral trap.

FIGS. 3(a)-3(e) show trapping of negatively charged 2 μm polystyrene spheres in a corral trap. FIG. 3(a) shows the microsphere marked by an arrow being trapped by bringing the corral trap to −10 V, as documented by selected brightfield images. The red status lights and the label "•ACT" next to the frame numbers (below each frame) indicate when the trap is active (frame 117 to 211). Dots mark the positions of selected free microspheres (circles) throughout the sequence. Scale bar in first image: 10 μm; microsphere centers are brightened for clarity. FIG. 3(b) shows frame-to-frame displacements of all microspheres observed in frames 96 to 232. The black line traces the average displacement of all free microspheres (2-7 microspheres/frame, 4.25 on average), while the trapped microsphere is indicated in red. The trap is active (−10 V) during the time interval highlighted in grey. FIG. 3(c) consists of selected brightfield images that show the trapping of a single microsphere (first row) and the simultaneous trapping of two microspheres (second row) with a trapping potential of −20 V; the same indicators were used as in FIG. 3(a). The trap is active from frame 47 to 74, then temporarily switched off, and activated again from frame 76 to 106. Scale bar in first image: 10 μm. FIG. 3(d) shows mean frame-to-frame speed of free and trapped microspheres at −10 V and −20 V, respectively. Error bars indicate the sample standard deviation, including uncertainties from the localization precision. FIG. 3(e) shows frame-to-frame displacements of all microspheres observed in frames 24 to 125. The black line traces the average displacement of all free microspheres (1-9 microspheres/frame, 5.35 on average), while the first and second trapped microspheres are indicated in blue and red, respectively. The trap is active (−20 V) during the time intervals highlighted in grey.

Figure 4:
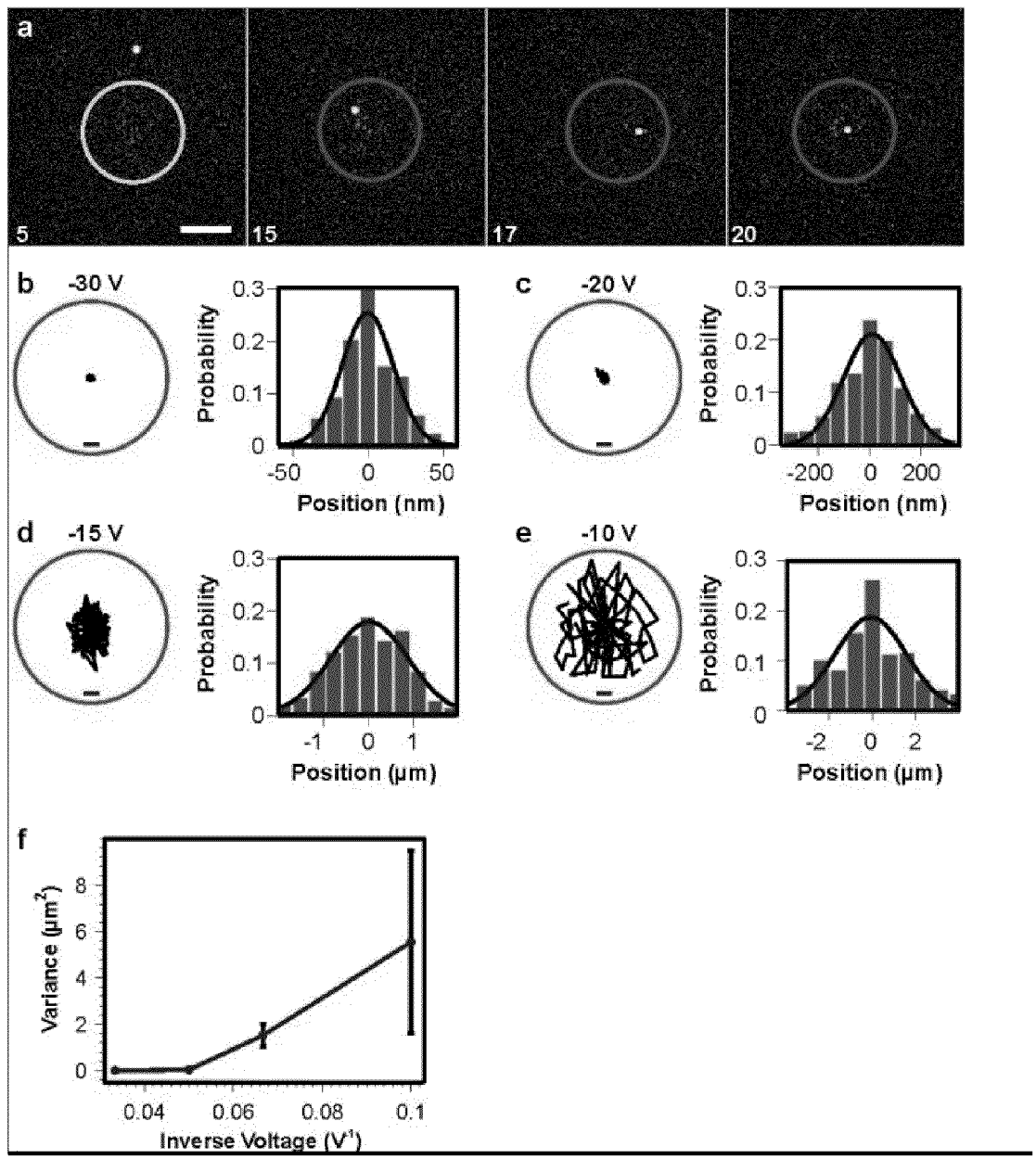
FIGS. 4(a)-4(f) show trapping of a negatively charged fluorescent nanobead in a corral trap.

FIGS. 4(a)-4(f) show trapping of a negatively charged fluorescent nanobead in a corral trap. FIG. 4(a) shows four fluorescence images from a longer video sequence (frame numbers indicated at the lower left) that demonstrate the trapping of a negatively charged nanobead in a 10 μm corral trap when a potential of −30 V is applied in frame 15. For each image, the fluorescence peak was visualized as a Gaussian spot with a width proportional to the localization precision, overlaid onto a background-subtracted image. The circle (red if trap is active) outlines the location of the corral trap, as determined from a brightfield image of the same area. Scale bar (see first image): 5 μm. FIGS. 4(b)-4(e) show trajectories of the bead inside the corral trap (left parts; scale bars: 1 μm) and histograms of the corresponding x/y excursions from the trap center (right parts; the black lines are Gaussian fits) at applied potentials of −30 V, −20 V, −15 V, and −10 V, respectively. FIG. 4(f) shows dependence of the variance from the Gaussian fits shown in FIGS. 4(b)-4(e) on the absolute value of the inverse trapping potential; error bars: 95% confidence limits.

FIGS. 5(a)-5(h) shows the trapping of a single fluorescently-labeled ssDNA molecule in a corral trap. FIG. 5(a) shows that a negatively charged ssDNA molecule is trapped when a potential of −30 V is applied in frame 32, as documented by selected fluorescence images. The fluorescence peak was processed in the same manner as in FIG. 4(a) and the same visual markers were used as in FIG. 4(a). Scale bar in first image: 5 μm. FIG. 5(b) shows a time trace of the trapped molecule's fluorescence intensity (imaging was briefly interrupted whenever the trapping potential was changed; see dashed lines). At least three blinking events with a sudden drop of fluorescence intensity to the background level occur at 25.8 s, 68.8 s, and 80.7 s; this results in time trace discontinuities because the spatial location of the molecule is unknown during the dark periods. FIGS. 5(c)-5(g) show trajectories of ssDNA inside the corral trap (left; blue scale bars: 1 μm) and histograms of the corresponding x/y excursions from the trap centre (right; solid lines: Gaussian fits) at different trapping potentials. FIG. 5(h) shows dependence of the variance from the Gaussian fits shown in FIGS. 5(c) to 5(g) on the absolute value of the inverse trapping potential (error bars correspond to 95% confidence limits). The arrows indicate the order in which the potentials were changed, starting with the leftmost data point (−30 V) on the blue line (starting point is the point in the lower left of graph; blue line is line associated with arrow pointing to the right); the first and last of the five data points are nearly identical.

The following non-limiting Examples are intended to be purely illustrative, and show specific experiments that were carried out in accordance with embodiments of the invention:

EXAMPLES

Example

Trap Fabrication and Characterization

Typical glass coverslips for optical microscopy were used as the support substrate for the corral trap. A thin layer of metal was evaporated onto a coverslip decorated with polystyrene beads, which prevented the metal from reaching the substrate. The beads were then removed from the surface, leaving behind precisely sized holes in the thin metal film, each one forming a single corral trap. The details of the experimental protocol are described below.

A traditional 25 mm×25 mm glass coverslip (thickness 0.16-0.19 mm) was cleaned through sonication for ten-minute intervals at 35° C. first in acetone, then in methanol, and finally in isopropyl alcohol. After sonication, the coverslips were dried under clean nitrogen gas.

An alternative method of cleaning the coverslips is using a series of sonication steps for 15 minute periods as follows: Acetone at 35° C. (VWR BJ010-4; HPLC grade), methanol at 35° C. (Sigma-Aldrich 650609; HPLC grade), dichloromethane at room temperature (VWR DX0831-6; HPLC grade), and finally isopropyl alcohol at 35° C. (Sigma-Aldrich 650447; HPLC grade).

In order to create a pattern for the creation of the corral traps, a 1 μL portion of a solution containing 10 μm polystyrene beads (Microspheres-Nanospheres 100243-05, Product ID # C-PS-10.0) was applied to the center of the coverslip, covering approximately $8 \times 10^5$ μm² of the substrate surface.

It is crucial to optimize the bead concentration in the solution since it is the later removal of these beads that produces the corral traps in the thin metal film. In order to determine the ideal concentration, serial ten-fold dilutions of the stock solution were produced in ultrapure water and examined under optical illumination. The polystyrene bead stock solution consisted of 10.0 μm diameter polystyrene beads at a concentration of 25 mg/mL. Dilutions proceeded until less than ten beads were observed in an area of about 200 μm×200 μm, resulting in a bead surface density on the substrate of roughly $2 \times 10^{-4}$ beads per μm². A surface coverage of this magnitude is ideal because it results in approximately one bead in the field of view of the microscope objective used for trapping experiments, and allows for the fabrication of multiple corral traps on one substrate while avoiding clustering. A 1:1000 dilution of the stock solution consistently resulted in the ideal bead surface density. In addition, this dilution was neither so concentrated as to result in a large number of bead pairings nor so dilute as to make it difficult to localize a corral trap after fabrication is complete.

In some embodiments, the bead solution that was used to produce the mask for the evaporation step was cleaned before use. Impurities in the original polystyrene bead solution may accumulate at the base of the beads after solvent evaporation and could create misshapen holes. Therefore, in some embodiments the original polystyrene bead stock solution was first centrifuged to separate the beads from the majority of the solvent. Next, the solvent was removed and replaced with an equal volume of ultrapure water (Sartorius Arium 611V). This procedure was subsequently repeated four times, resulting in little or no impurity accumulation at the base of the beads after solvent evaporation, as confirmed by scanning electron microscopy.

Figure 6:
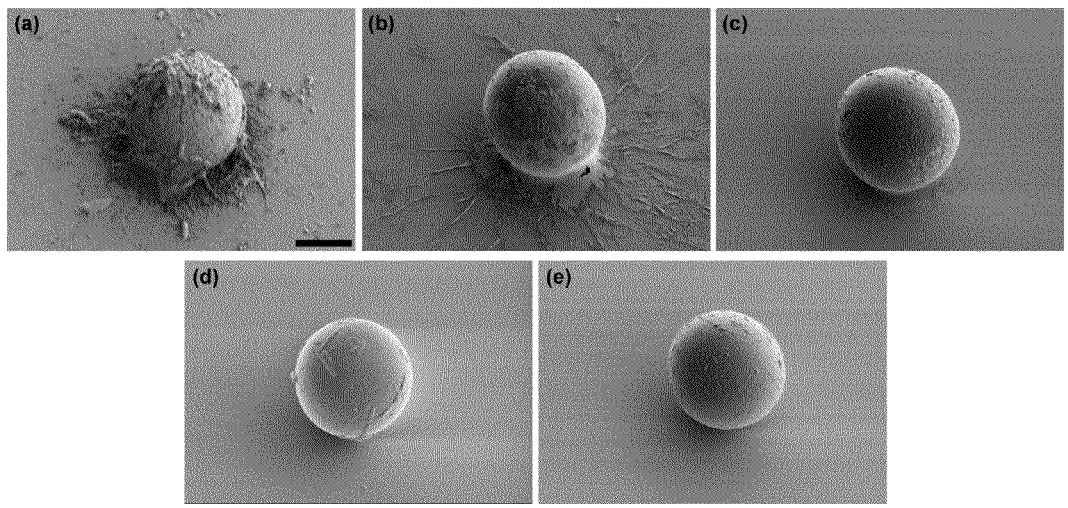
FIGS. 6(a)-6(e) show scanning electron micrographs of 10 μm polystyrene beads after consecutive centrifuging and re-suspension cycles (without metal).

Scanning electron microscopy (SEM) of the coverslips after the application of the diluted bead solution revealed an additional problem with the bead application process. FIGS. 6(a)-6(e) show scanning electron micrographs of 10 μm polystyrene beads after consecutive centrifuging and re-suspension cycles (without metal). Scale bar in first image: 5 μm. FIG. 6(a) shows the original solution. FIG. 6(b) shows the solution after one, FIG. 6(c) after two, FIG. 6(d) after three, and FIG. 6(e) after four cleaning cycles. It can clearly be seen that there is an marked decrease in the amount of contamination in these representative images.

Although their average surface density was acceptable, the beads were generally found in the evaporation ring that was left behind after the solution droplet had dried. The evaporation ring contained significant contamination which appeared in higher concentrations near the base of the beads themselves (see FIG. 6(a)), possibly due to delayed solvent evaporation in this area due to capillary forces. In an attempt to remove the contamination from the stock solution containing the beads, 1 mL of it was centrifuged for 10 minutes at 17000 rpm. Afterwards, exactly 800 μL of the supernatant was removed and replaced with ultrapure water. This process was repeated four times and a 1 μL portion from each cleaning cycle was applied to a clean coverslip for SEM examination (FIGS. 6(b)-6(e)). As can be seen, this process resulted in a dramatic decrease in the quantity of the contamination, while the number of beads per microliter did not decrease significantly (as verified by performing beads counts in the deposited drops). In addition, no change in the appearance of the beads themselves (clustering, abnormal morphology) was noted due to the removal of the original solvent.

After bead application, the solution on the coverslip was allowed to dry at room temperature in a clean environment for one hour. Once dry, the coverslip was transferred to a thermal evaporation unit. Approximately 5 nm of 60-40 Gold-Palladium (VWR: AA41206-BW) was then thermally evaporated onto the bead-decorated coverslip in a vacuum chamber at a pressure of ~$4.5\times10^{-5}$ torr. The substrate was placed at a distance of 12.5 cm from the source, and thermal deposition proceeded at an evaporation rate of roughly 0.1 Amps/sec.

Figure 7:
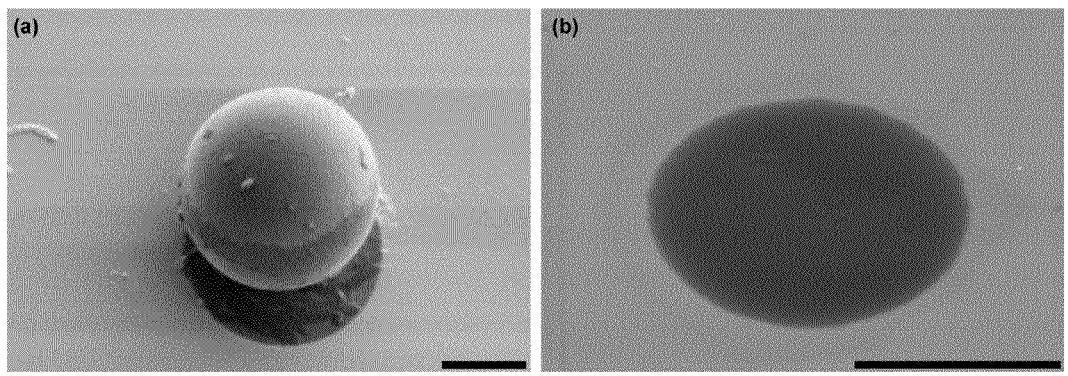
FIGS. 7(a)-7(b) show scanning electron micrographs of 60-40 Au—Pd thin films with (FIG. 7(a)) and without (FIG. 7(b)) a 10 μm bead.

Next the coverslips were inspected under optical illumination for integrity of the thin film. Only coverslips with continuous metal films were moved on to the next step, in which the coverslips were treated to remove the polystyrene beads that had been used as masks (see FIGS. 7(a) and 7(b)). FIGS. 7(a)-7(b) show scanning electron micrographs of 60-40 Au—Pd thin films with (FIG. 7(a)) and without (FIG. 7(b)) a 10 μm bead. Scale bars: 5 μm. Note that the scale bars (lower right) are different in the two images. Removal of polystyrene beads was accomplished through partial dissolution of the polystyrene in order to decrease the bead's adhesion to the glass surface and subsequent sonication. Various different solvents have been used previously for the removal of polystyrene beads from glass substrates, including dichloromethane, toluene, ethanol, water and methanol. The effectiveness of each of these solvents at removing the polystyrene beads from the surface was investigated, but no significant differences were found.

It was found that the time during which the coverslip was subjected to sonication was crucial due to the fragility of the deposited metal films. The following procedure resulted in a reasonable bead removal percentage of 75% while maintaining the integrity of the film in 50% of the samples: sonication in toluene for a total of 10 minutes, gentle rinsing with isopropyl alcohol to eliminate any residue from the previous step, and finally drying under clean $N_2$.

After fabrication, the trap electrode—which contains many corral traps (holes)—was visually inspected under optical illumination. First the integrity of the thin film itself was examined once again to ensure that there was no damage to it from the sonication step. Only trap electrodes with continuous films (no large cracks or tears) were considered good candidates for experimentation. The proximity of the holes to the edges of the coverslip and to other holes was examined, and only holes with few neighbors, no nearby film imperfections, and central location were selected. After visual inspection, a single copper wire was attached to the corner of the trap electrode using silver paste or carbon tape in order to establish electrical contact with the power supply. It should be noted that electrolysis of water or even minor charge uptake by the solution has never been observed during the experiments, even at applied potentials as high as 30 V, i.e., much higher than the electrolysis threshold of water at room temperature (1.23 V). This is expected, as there exists no conductance pathway across the solution, which is necessary to sustain electrochemical reactions. The corral trap setup requires no counter electrode; the presence of a single electrode is sufficient for trap operation.

For a typical trapping experiment, a dilute solution of the objects to be trapped was either sandwiched between the trap electrode and a second glass coverslip, or applied to the trapping electrode through spin coating. In early experiments, a second copper wire was usually attached to the top glass coverslip (on the side facing away from the solution) and connected to the ground potential of the voltage source. A second electrode is theoretically not necessary since the working principle of the trap is only based on the accumulation of charges on a single electrode; this was later confirmed by experiments without grounding electrode. An electric potential was applied to the trap electrode as soon as a particle of interest traveled past the rim of the corral trap (trigger event), which was monitored using a CCD camera (Photometrics Cascade II:512). The particle was released from the trap only when the voltage was turned off.

Example

Optical Imaging Setup

To carry out the trapping experiments, the coverslip with the patterned trapping electrode was mounted onto an inverted optical microscope (Zeiss Axiovert 200M) and connected to a low-noise, high resolution programmable power supply (BK Precision 9123A; 0-30 V DC, maximum resolution: 0.5 mV). Widefield images of the sample were acquired with an electron-multiplying CCD camera (Photometrics Cascade II:512 EMCCD) mounted to the base port of the microscope and collected, viewed and processed by a computer (3.0 GHz Pentium 4 PC running Windows XP Pro).

For brightfield mode imaging, the halogen lamp of the inverted microscope was used to illuminate the sample. The transmitted light was collected by a 100× oil immersion objective (Zeiss α-Plan-FLUAR 100X/1.45; numerical aperture: 1.45) and imaged with the CCD camera. For fluorescent imaging, the same collection optics were used, but the sample was now illuminated by the 514.5 nm line of an Argon Ion laser (Spectra-Physics Stabilite 2017-AR). The laser light was coupled into the back port of the inverted microscope and focused near the back focal point of the microscope objective (epifluorescence mode). In this case, a set of optical filters adapted to the laser line and the fluorescence emission characteristics of the investigated sample were employed (excitation filter z514/10, dichroic filter z514rdc, emission filter hhq519lp; Chroma).

In order to ensure that the object motion observed was not due to drift of the sample stage, experiments were conducted on immobilized, fluorescent single molecules. A dilute solution of protoporphyrin IX (PPIX) in dimethyl sulfoxide was created and added to a solution of PMMA in toluene (8.2 g $L^{-1}$). A thin film was produced by spin coating 100 μL, of this solution (with a final PPIX concentration of 64 pmol $L^{-1}$) onto a clean coverslip at 5000 rpm for 15 s. 500 fluorescence images were acquired over a period of about 150 s with a 100 ms exposure time. The fluorescence peak of a selected single molecule was isolated in a 20×20 pixel sub-image and localized by 2D Gaussian fitting using single fluorophore localization routines. The fitting was accomplished using a point spread function (PSF) radius of 205 nm (estimated from the optical parameters of the setup), a rolling ball background subtraction, and an expansion factor of 12 for creating 91.8 $nm^2$ sub-pixels. The average single frame localization precision was 22.1±6.8 nm. In comparison, the x and y coordinates of the centers from the Gaussian fits yielded standard deviations of x and y positions of 34±5 nm and 23±5 nm, respectively. This is in relatively good agreement with the average single frame localization precision, indicating that stage drift was indeed very small within the timeframe of the experiment. In addition, linear fits to the data yielded very small values for the respective slopes of the fits, from which the stage drift during a typical experiment lasting 100 s can be estimated to be 0.24 pixels (26.7 nm) in the x and 0.04 pixels (4.7 nm) in the y direction.

Example

Trapping of Microscale Particles

First experiments were carried out by observing the flow of negatively charged polystyrene microspheres with a diameter of 2.0 μm in solution, confined between the trapping electrode and a top coverslip.

The sample consisted of a 2×10$^{-6}$ mg/mL stock solution of 2.0±0.13 μm carboxylatemodified beads (Invitrogen F-8827) in a 1:1 v/v mixture of water and glycerol (Aldrich #191612; spectrometric grade), which was added to slow down particle movement. The solution was titrated to pH 10 with 1 mol $L^{-1}$ sodium hydroxide solution in order to fully deprotonate the carboxylic acids on the bead's surface. According to manufacturer data, with full deprotonation there are approximately $10^8$ charge groups per 2 μm bead.

Axial confinement was provided by a Vaseline wet mount of the sample solution, which resulted in a thin, disc-shaped fluid volume in the z-direction. 1 μL of the solution was deposited onto the trapping electrode in the region of a previously located corral trap in a 5 nm thick 60:40 (w/w) Au—Pd film. A second, non-metalized coverslip with a thin layer of Vaseline applied along its edges was then placed over the sample, and slight pressure was applied to spread the solution as much as possible while maintaining its continuity. The thickness of the solution layer, determined from volume and covered area, was about 2 μm. The use of the Vaseline also helped reduce solvent evaporation, allowing for longer observation and trapping periods. The application of some pressure near the edge of the sample chamber induced directional flow of the beads in the solution.

Brightfield images of the sample were acquired at 1 s intervals with an exposure time of 100 ms. After data acquisition, the multi-dimensional tiff-file containing the entire video sequence captured by the CCD camera was then imported into Matlab (The Mathworks) and separated into individual frames. For each frame, the locations of the trapped bead(s) were determined using the following procedure. First, a sub-image framing the trapping region was selected, and a Canny filter was applied for edge localization at the subpixel level. Once a bead was identified, an ellipse was overlaid onto its filtered image, and the bead center was determined from the center coordinates of the ellipse.

The corral trap, initially held at ground potential (0 V), was activated by applying a potential of −10 V as soon as one of the microspheres moved into the trapping region. After data acquisition, the location of each microsphere was determined through the application of a Canny filter for edge localization followed by the overlaying of an ellipse onto the filter image for centre localization at a subpixel level. The sequence of images in FIG. 3(a) demonstrates that the microsphere remains trapped while the potential is applied (frames 140-190), and is released as soon as the voltage is turned off. The clear correlation between particle confinement and applied potential as well as the reversibility of the event proves that nonspecific binding of the particle to the exposed glass substrate is not responsible for the observed behaviour.

As shown in FIG. 3(a), the flow of free microspheres far away from the corral trap is a superposition of (induced) directional flow and Brownian motion and remains largely unaffected by trap activation. Microspheres closer to the active trap, however, are deviated by the high charge concentration near the metal rim (see, for example, the two microsphere trajectories in the centre of frame 165, FIG. 3(a)). Moreover, the speed of the trapped particle drops immediately after trap activation, as evidenced by the frame-to-frame displacements shown in FIG. 3(b). This is expected because the particle no longer travels on a flat potential energy surface, but now moves inside a potential energy well, which constrains its location and reduces the distance that it can travel within a given time period.

To test the predictions of theory further, we proceeded with the trapping of a different particle at −20 V (first row of images in FIG. 3(c)). The more negative potential should lead to a steeper electrostatic potential well and therefore to a tighter particle confinement as well as reduced frame-to-frame speeds. This expectation is supported by our data, as evidenced by the almost stationary position of the trapped particle, the speed histogram shown in FIG. 3(d), and the first half of the time trace in FIG. 3(e).

In addition, a corral trap is expected to be able to trap multiple particles simultaneously due to the existence of a stationary potential well. We tested this capability by allowing a second particle (indicated by an arrow in frame 70, FIG. 3(c)) to enter the trap by temporarily switching off the applied potential, which resulted in the successful trapping of both microspheres. The particles performed a circular motion around a common centre inside the trap (second row of images in FIG. 3(c)) until they were released by deactivating the trap. It is interesting to note that the "dancing microspheres" kept a constant distance from each other, which is dictated by the relative charges on the microspheres and the surrounding charge corral. The average distances of the first and second microsphere from the centre of the trap were very similar (1.48 and 1.55 μm, respectively; see FIG. 9), which was expected since they carry similar charges. This is further supported by the time traces in FIG. 3(e), showing the same drop in particle speed after trap activation.

Example

Trapping of Nanoscale Particles

The microspheres used above contain ~$10^8$ pendent carboxyl groups each. In order to test whether particles with far fewer surface charges can be trapped in an electrostatic corral, we proceeded with experiments using the smallest available polystyrene spheres (mean diameter: 21 nm) carrying ~900 carboxyl groups. The effective charge per nanobead is expected to be lower due to charge shielding by cations and solvent molecules and incomplete deprotonation of carboxyl groups in proximity to high local charge concentrations.

The sample consisted of a $10^4$-fold dilution of an aqueous suspension (2% solids) of 21±3 nm carboxylate-modified, fluorescent polystyrene beads (Invitrogen F-8787; λmax=505 nm) in a 5% v/v, aqueous glycerol solution (Aldrich #191612; spectrometric grade). The solution was titrated to pH 10 with 1 mol $L^{-1}$ sodium hydroxide solution in order to fully deprotonate the carboxylic acids on the bead's surface. According to manufacturer data, there are about 940 charge groups per 21 nm bead (ranging from 590 charge groups for an 18 nm bead to 1400 charge groups per 24 nm bead).

1 μL of the solution was deposited onto the trapping electrode in the region of a previously located corral trap in a 5 nm thick 60:40 (w/w) Ni—Cr film and then spin-coated for 30 s at 8000 rpm (Laurell Technologies WS-400B-6NPP/LITE/10K). This process resulted in a thin sample with a thickness of no more than 1 μm (as determined from the deposited volume and the covered area). To reduce solvent evaporation, a closed chamber was fabricated by sealing a second coverslip to the trapping electrode using Vaseline, as in the experiments with 2 μm beads. The sample chamber was mounted onto the microscope, and a flow was induced by tilting the sample slightly during sample mounting. This was accomplished by shimming two corners of the trapping electrode with slivers of a coverslip, which resulted in a tilt angle of 1.4°.

Fluorescence imaging of the sample was performed using the multiplication gain amplifier at 5 MHz readout rate with an exposure time of 100 ms and a custom frame-to-frame delay, which resulted in a frame rate of 3.3 fps. Since the fluorescence signal of a single bead is relatively strong, high contrast images were already obtained with an on-chip electron-multiplication gain of unity and a preamplifier gain of 3 electrons per count unit.

After data acquisition, the multi-dimensional tiff-file containing the entire video sequence captured by the CCD camera was then imported into Matlab (The Mathworks) and separated into individual frames. For each frame, a region of interest of 17.25×17.25 μm² around the corral trap was selected, and any bead fluorescence was fit to a 2D Gaussian using the same fitting procedure described earlier (see "Optical imaging setup") but using a PSF radius of 167 nm (determined from the optical parameters).

Our experiments confirm that such nanobeads can easily be trapped, as evidenced by the trapping event shown in FIG. 4(a). In this case, fluorescence imaging was employed for bead localization since it resulted in higher contrast images than simple brightfield observation. During this experiment, the nanobead remained trapped until the applied potential was turned off by the operator (1.9 min). We have conducted other experiments, where nanobeads remained trapped for more than an hour and were successfully released once the trapping potential was turned off by the operator.

Trajectories of nanobeads at different applied voltages (left parts of FIGS. 4(b)-4(e)) were obtained by localizing the bead centre using 2D Gaussian fitting routines commonly employed for super-resolution microscopy and tracking the bead position across the 100 video frames that were recorded at each trapping voltage.

It can be seen that increasing the applied potential again leads to better lateral particle confinement. Since the electrostatic corral is nearly harmonic according to our calculations, the probability P of finding the particle at coordinate x relative to the trap centre (at x=y=0) is proportional to $$P(x) \propto \exp\left(-\frac{kx^2}{2k_B T}\right)$$

where k is the trap stiffness of a Hookean potential, $k_B$ the Boltzmann constant, and T the absolute temperature. The histogram of x and y positions therefore has a Gaussian shape, with a variance $\sigma^2$ that is directly related to the trap stiffness:

$$\sigma^2 = k_B T/k$$

Our data show that particle excursions indeed follow such a normal distribution law (right parts of FIGS. 4(b)-4(e)).

If we neglect any nonlinear effects related to the formation of an electric double layer in proximity of the charge corral, we should expect that the trap stiffness scales linearly with the charge density on the corral trap and therefore with the applied potential in volts. A plot of $\sigma^2$ as a function of the inverse applied potential should then be linear; however, the plot shown in FIG. 4(f) exhibits a strongly nonlinear behaviour. We attribute this to a continued repulsion of the nanoparticle in the axial direction as the applied potential is sequentially changed from −30 V (leftmost data point in FIG. 4(f)) over −20 V and −15 V to −10V. At larger axial distances, the electrostatic corral is shallower and the trap stiffness decreases, which leads to greater-than-expected values of $\sigma^2$ for the smaller applied potentials.

Example

Trapping of Single Molecules

Encouraged by these results, we proceeded with the trapping of a single, charged molecule in an electrostatic corral. 800-nucleotide single-stranded deoxyribonucleic acid (800-nt ssDNA) was chosen for these experiments, since it carries a charge load comparable to that of a single nanobead. Each ssDNA was covalently linked to a single Cy3 fluorophore and imaged by fluorescence excitation using a sensitive electron-multiplying CCD camera with the on-chip electron-multiplication gain set to its maximum value, resulting in a signal amplification of ~1000 times; standard buffer conditions were maintained during the experiment.

The ssDNA solution consisted of an 8 nmol $L^{-1}$ solution of 800 nt ssDNA sizing standard in a TBE buffer (44 mmol $L^{-1}$ Tris, 44 mmol $L^{-1}$ boric acid, 1 mmol $L^{-1}$ EDTA) labeled with a single Cy3 indocarbocyanine dye molecule (Bioventures, Inc). The solution was titrated to pH 8.5 with 1 mol $L^{-1}$ sodium hydroxide to ensure deprotonation of the phosphodiester backbone, producing the maximum effective charge. The sample was applied to the trapping electrode and flow was induced in the same manner as in the 20 nm bead experiments.

Fluorescence imaging of the sample was performed in non-overlap mode using the multiplication gain amplifier at 5

MHz readout rate with an exposure time of 100 ms, which resulted in a frame rate of 7.7 fps. Since the fluorescence signal of a single molecule is very weak, the on-chip electron-multiplication gain was set to its maximum value, resulting in a signal amplification of ~1000 times, and a preamplifier gain of 3 electrons per count unit was used.

After data acquisition, the multi-dimensional tiff-file containing the entire video sequence captured by the CCD camera was then imported into Matlab (The Mathworks) and separated into individual frames. For each frame, a region of interest of 23×23 µm² around the corral trap was selected, and any single molecule fluorescence was fit to a 2D Gaussian using the same fitting procedure as for the 20 nm beads.

Figure 5:
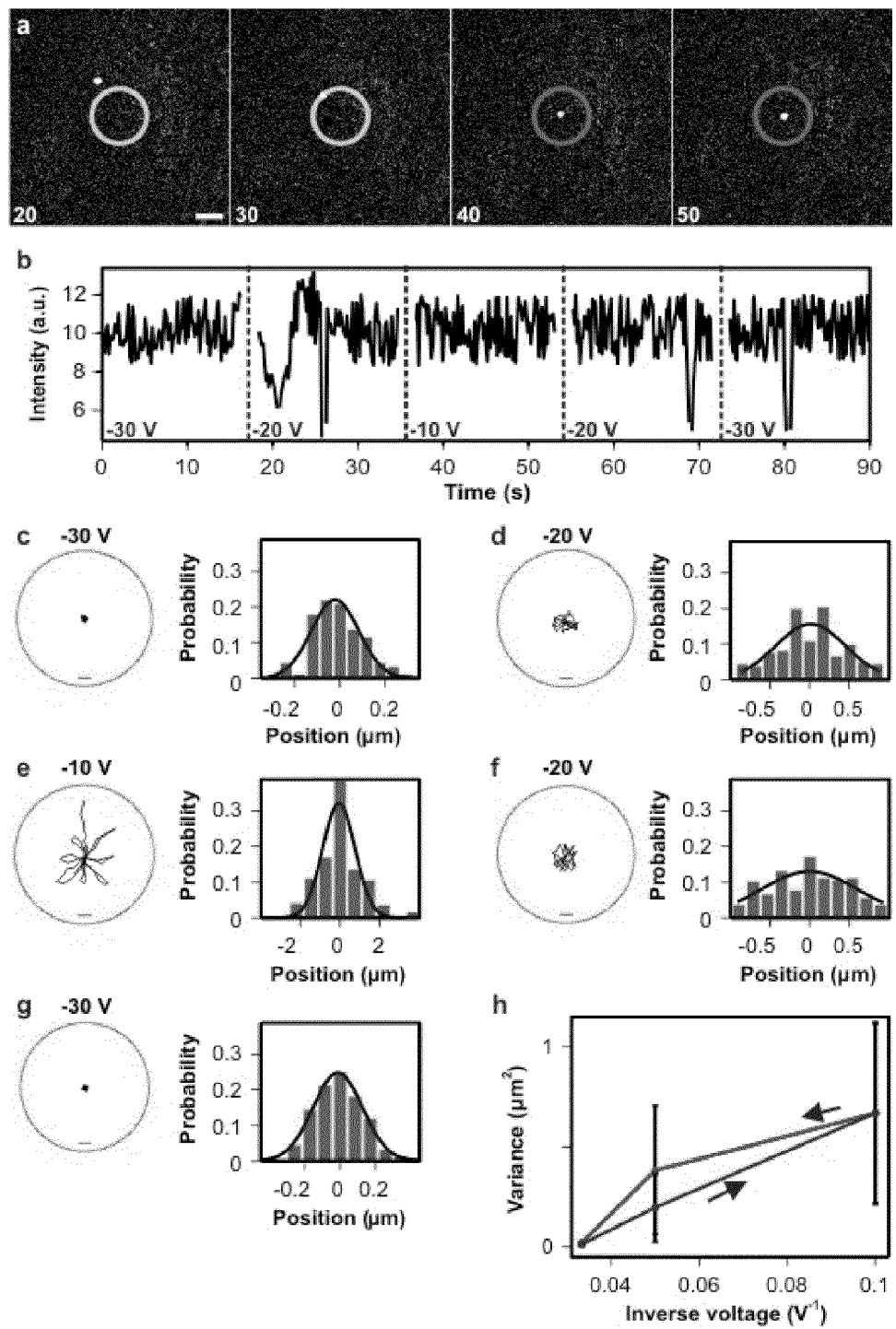
FIGS. 5(a)-5(h) shows the trapping of a single fluorescently-labeled ssDNA molecule in a corral trap.
Figure 8:
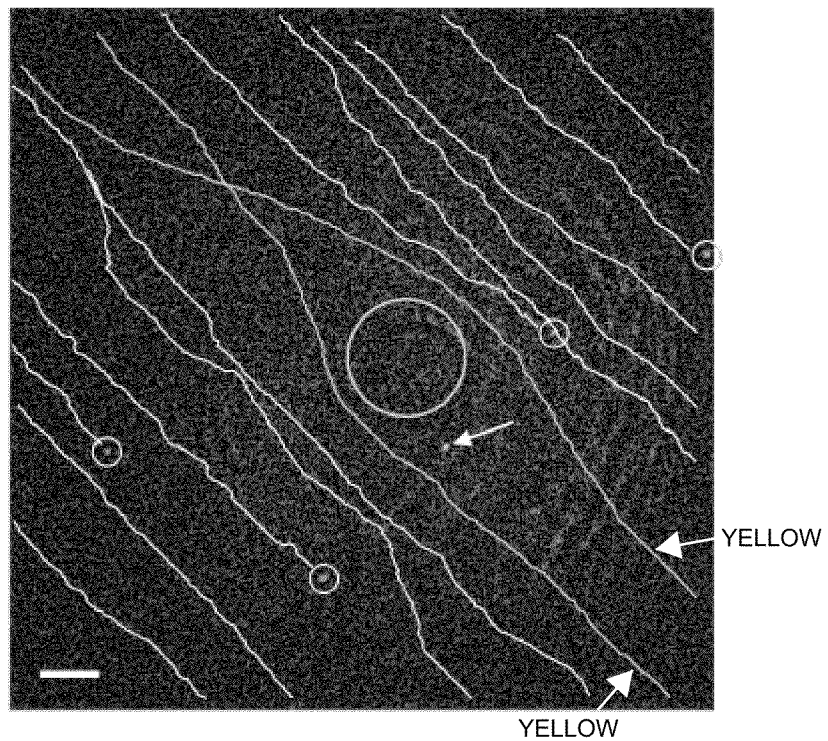
FIG. 8 shows a trajectory plot of all free, 800-nt ssDNA within the observation area during the experiment described by FIG. 5 (scale bar: 5 μm).

FIG. 8 shows a trajectory plot of all free, 800-nt ssDNA within the observation area during the experiment described by FIG. 5 (scale bar: 5 µm). It can be seen that the corral trap, outlined by the circle in the center of the image (position determined from a brightfield image of the same area), acts locally and does not disturb the trajectories of far-away molecules (white lines), but significantly deviates molecules that flow towards the corral trap while it is active (yellow lines). The trajectories are superimposed onto the last, background-subtracted frame of the video sequence. The position of the previously trapped ssDNA molecule, after its release from the trap, is indicated with an arrow; the four other (free) beads are indicated by circles. Scale bar: 5 µm.

The successful trapping of a single ssDNA molecule in a corral trap is shown in FIG. 5(a). Intermittency in fluorescence emission (blinking) was observed several times during the experiment (FIG. 5(b)), confirming that the observed fluorescence peaks are indeed stemming from single molecule emitters. The dark periods lasted 440 ms on average, probably due to photo-induced, triplet state mediated charge transfer to the DNA backbone. It should be pointed out that the molecule remained stably trapped during these long-lasting dark states, even though the position of the molecule was unknown. As mentioned before, corral trap operation only depends on the presence of a static electric field, and not on information about particle position.

After a single ssDNA molecule was trapped, we cycled the applied potential from −30 V to −10 V in steps of 10 V and back to −30 V, and trajectories were reconstructed from 2D Gaussian fits as before (FIGS. 5(c)-5(g)). It can be clearly seen that the excursions from the trap centre increase as the applied potential is decreased, and that the plot of $\sigma^2$ as a function of inverse applied potential exhibits the expected linear relationship (FIG. 5(h)). This indicates that the ssDNA remained at the same axial distance from the corral throughout the experiments, as further evidenced by the fact that the histograms of particle excursions at −30 V are almost identical at the beginning and the end of the experiment. It was also observed during the single molecule experiment that the corral trap acts locally (as noted for the microscale trapping experiment) and does not disturb the trajectories of far-away molecules, but significantly deviates molecules that flow towards the corral trap while it is active (see FIG. 8). In these experiments, the single ssDNA molecule remained trapped for 90 seconds until the operator chose to turn off the trapping potential.

Example

Statistical Analysis

In order to determine the exact location of the trap centre, the centre of motion of the trapped particle was calculated for the highest applied trapping potential. This was accomplished by determining the average location of the object in both x and y directions. Determination of the geometric center of the trap was attempted, but the lack of sharp step edges at the rim of the hole made determination by this means unreliable.

The bins for all x/y histograms were obtained by determining the maximum absolute value m of the x/y distances from the trap center and dividing the range between +m and −m into eleven equally spaced intervals. The histograms were then fit to a Gaussian function by a nonlinear least squares fit using a Trust-Region algorithm.

Figure 9:
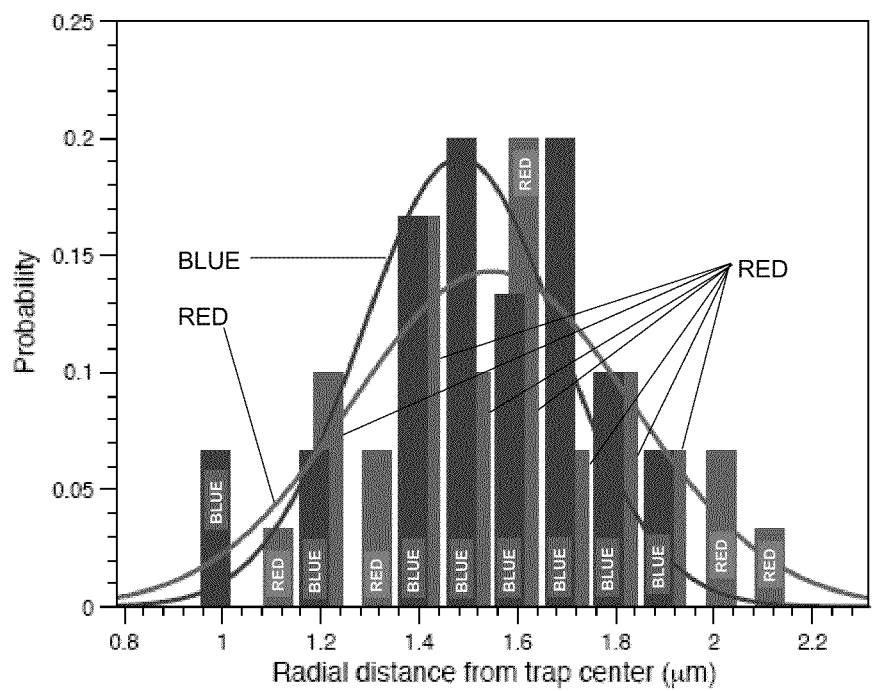
FIG. 9 shows histograms of radial positions (relative to the trap center) for the two simultaneously trapped 2 μm polystyrene beads shown in FIG. 3(c), where the first trapped bead is shown in blue and the second trapped bead is shown in red, as in the time trace shown in FIG. 3(e).

FIG. 9 shows histograms of radial positions (relative to the trap center) for the two simultaneously trapped 2 µm polystyrene beads shown in FIG. 3(c), where the first trapped bead is shown in blue and the second trapped bead is shown in red, as in the time trace shown in FIG. 3(e). The parameters of the Gaussian fits (solid lines) are: Gaussian center of first bead at 1.483±0.067 µm, half-width of 0.474±0.157 µm; Gaussian center of second bead at 1.547±0.093 half-width of 0.672±0.221 µm. The bins for each bead histogram were obtained by dividing the range between minimum and maximum values of the radial distance into eleven equally spaced intervals.

Example

Focused Ion Beam Fabrication

As an alternative to the shadow evaporation method described herein, a focused ion beam (FIB) has been used to mill the holes into thin metal films. This method increases the reproducibility of corral trap fabrication and allows for exploration of various trapping geometries. It enables the intentional positioning as opposed to a random placement of corral traps, which is characteristic of the shadow evaporation method. In addition, it provides for the creation of virtually any pattern and shape in the thin metal film.

The fabrication process of the corral trap using this method consists of two basic steps: thermal evaporation to produce the thin metal film, and micropatterning of the holes into the film. The glass coverslip substrate is cleaned as previously described. Onto this substrate approximately 5 nm of 60-40 Nickel-Chromium (Ted Pella: 13082) followed by ~5 nm of 60-40 Gold-Palladium (VWR: AA41206-BW) is thermally evaporated in a vacuum chamber at a pressure of ~4.5×10⁻⁵ torr. The substrate is placed at a distance of 12.5 cm from the source, and thermal deposition proceeds at an evaporation rate of roughly 0.1 Amps/sec. After the production of the metal film the coverslips are cleaned by gentle rinsing in isopropanol and drying under clean $N_2$. They are then inspected under optical illumination for the presence of cracks and tears.

The coverslip with the thin metal film is next transported to a high-resolution field emission scanning electron microscope (SEM) equipped with a focused ion beam mill (Zeiss 1500XB CrossBeam Workstation, Carl Zeiss, Oberkochen, Germany). A predetermined pattern is programmed into the instrument and after focusing, the thin metal film is milled away with an accelerating voltage of 30 kV and a current of 2 nA to produce the desired result (FIG. 10).

Prior to its use, the trap electrode (often containing many corral traps) is visually inspected under optical illumination. First the integrity of the thin film itself is examined for any possible damage due to handling or mounting procedures. Only trap electrodes with continuous films (no large cracks or tears) are considered good candidates for experimentation.

Figure 10:
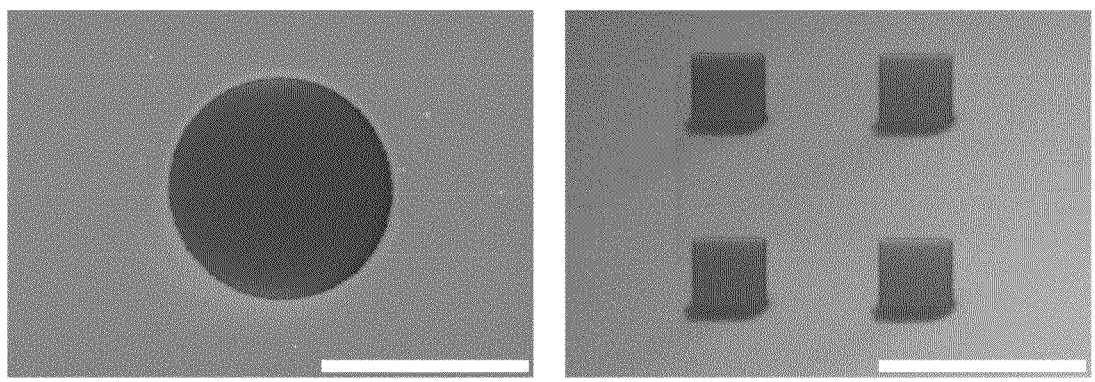
FIG. 10 shows scanning electron micrographs of circles (left) and squares (right) which were milled into a thin metal film using a focused ion beam.

FIG. 10 shows scanning electron micrographs of circles (left) and squares (right) which were milled into a thin metal film (~5 nm 60-40 Nickel-Chromium and ~5 nm 60-40 Gold-Palladium) using a focused ion beam. Scale bars are 10 μm and 30 μm, respectively.

Example

Microfluidic Cell Integration

The integration of the corral trap into a microfluidic device is important for many applications in biomedical analysis. A microfluidic cell will allow for more precise control over critical experimental parameters (such as axial confinement), and, through the rapid exchange of solutions, will make it possible to use a single corral trap multiple times for the analysis of several different samples. It also opens up the possibility of massive parallelization by integrating two-dimensional arrays of corral traps into a single microfluidic device.

The trapping electrode, as previously described, serves as the base for the device. The axial distance from the trap is restricted through the use of a spacer, which is created on the top part of the device. This component consists of a typical glass coverslip for optical microscopy through which holes are fashioned for the connection of capillary tubes.

Figure 11:
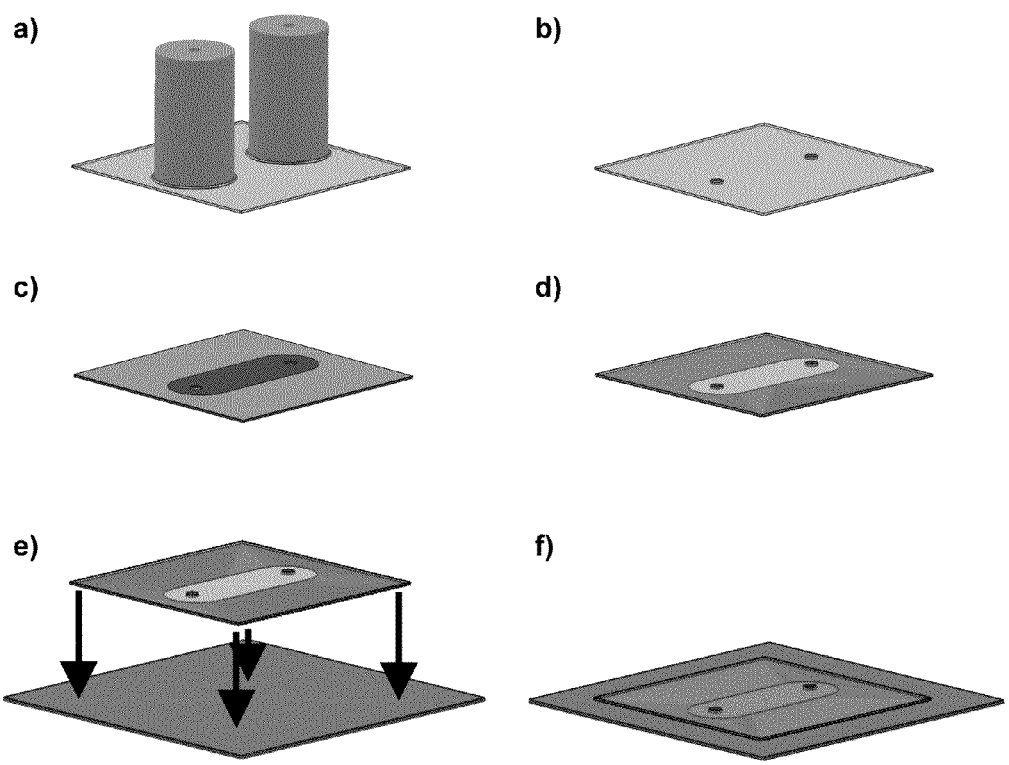
FIG. 11 depicts the processing steps (a)-(f) for the fabrication of an integrated microfluidic and trapping device.

FIG. 11 depicts a process for the fabrication of a microfluidic device for the corral trap. The attachment of Teflon tubing (a) facilitates the etching of holes through the top surface (b) to allow for the later connection of capillary tubing to the device. Next, a 1 μm metal film is created by first applying a mask to block metal deposition (c) and subsequent thermal evaporation to form a microfluidic channel of the proper dimensions (d). Finally, the device is assembled by positioning the top surface over the trapping electrode (e) and sealing through the application of pressure and adhesive (f).

The first step in the procedure is the creation of holes through the top component of the device in order to facilitate the connection of capillary tubing for the delivery (and removal) of sample solution to (and from) the corral traps. The top component consists of a traditional 18 mm×18 mm glass coverslip (thickness 0.16-0.19 mm), which is cleaned through sonication for 10-minute intervals at 35° C. in acetone, methanol, and finally in isopropyl alcohol. After sonication, the coverslip is dried under clean nitrogen gas. In order to produce the holes, two 1 cm lengths of Teflon tubing (inner diameter 1 mm, outer diameter 6 mm) are placed at a distance of 10 cm from each other and glued in place with a UV curing adhesive (Loctite 3491, Henkel Technologies). The tubes are next filled with 10 μL, of 40% hydrofluoric acid (puriss.p.a., Sigma-Aldrich) for a period of 1 hour. After the creation of the holes the adhesive holding the Teflon tubes in place is removed with acetone.

Next, the coverslip is transferred to a thermal evaporation unit for production of the microfluidic channel. This process provides for axial confinement of the sample by restricting the distance between the trapping electrode and the top surface to about one micron. A paper mask is produced and overlaid onto the coverslip for the purpose of blocking metal deposition in the area of the channel. An adhesion layer of 60-40 Nickel-Chromium (~5 nm) is first thermally evaporated onto the coverslip, followed by deposition of a one micron thick layer of aluminum. After thermal evaporation the mask is removed and the coverslip containing the holes for capillary tubes and the spacer layer is positioned onto the trapping electrode. The assembly is held in place through use of pressure and a UV curing adhesive.

Example

Software for Automated Trapping

While it is possible to trap slow-moving objects by manual activation of the trapping voltage once an object enters the trapping region, it is necessary to automate this task for fast-moving particles or if multiple particles are to be trapped. For the following discussion, it is useful to distinguish four phases of a single-particle trapping experiment: (A) "trap armed" phase: the sample is continuously monitored until a trigger event occurs; (B) "trap on" phase: the trap is activated by applying an electric potential, (C) "trap active" phase: continued trap operation; and (D) "trap off" phase: the trap is switched off and the particle is released.

To start the trapping process, the camera is set to free-run mode where it acquires images continuously at a predefined frame rate until the operator decides to stop the data acquisition. The frame rate is not a critical parameter for any of the four phases; for example, in phase C, the trap remains active as long as the trapping potential is applied, even if the camera is turned off.

Moreover, in order to detect a trigger event during phase A (a particle moving into the trapping region), it is not usually necessary to closely follow the particle trajectories over time (although this can be helpful in manual mode, where a trigger event can be much better anticipated). It is important, however, to minimize the time between the moment when the acquisition of an image frame is initiated and the (potential) subsequent trap activation. This trigger delay is mainly determined by (a) the frame acquisition time and frame read time, (b) the time needed for image analysis, (c) the time necessary to send the command to the power supply, and (d) the time required to physically charge the metal film. If the trigger delay is greater than the time a particle typically needs to cross the trapping region, the probability for successful trapping becomes minimal and the same as for a "blind" trapping attempt (i.e., without position monitoring).

In order to minimize the frame acquisition time and frame read time, user-adjustable camera settings such as exposure time, shutter operation, readout speed, clear counts and binning can be optimized. Most of these settings, however, are dictated by signal-to-noise considerations (e.g., exposure time and readout speed) and/or depend on the desired image resolution (e.g., binning). Theoretically, the Cascade II:512 camera used in our experiments can digitize a full 512×512 pixel image frame in 26.2 ms if the electron-multiplication amplifier is used at its highest digitization speed (10 MHz). According to specifications, the actual frame readout time is greater than 34 ms, which is due to additional factors such as the time required to shift each row of pixels into the serial register (parallel shift time) and to move the data into computer memory after digitization. This time is further increased by the exposure time, which is typically on the order of 10-100 ms for an adequate signal-to-noise ratio.

The goal was therefore to develop a simple and efficient algorithm that analyzes each image frame as it becomes available and decides on whether or not a trigger event has occurred; the execution time for this module had to be as small as possible, but in any case much smaller than the time between consecutive image frames. Furthermore, it should allow trapping of a new particle while one or more particles are still residing inside the trap. All of this was accomplished using the following approach.

Before a trapping experiment, the corral trap is imaged using optical contrast in order to determine its exact location relative to the field of view of the camera (which, we will assume, does not change during the timeframe of the experiment). Next, a 512×512 mask array containing only "0"s and "1"s arranged in a particular shape (discussed below) is created based on this information. Element-wise multiplication of an image frame with this mask array leads to a masked image in which only the region of interest, the trigger region (marked by "1"s in the mask array), will show through. Each pixel of the masked image is then analyzed to determine whether its value falls within a user-specified range. The minimum threshold is set above the background level (dark noise and background fluorescence), while the upper limit should be set well above the expected peak fluorescence signal of a particle but below the value for cosmic ray events, which would otherwise lead to false triggers. Discrimination between cosmic rays and fluorescence signals based on the values of surrounding pixels is computationally more expensive than simple thresholding.

A particle entering the trapping region needs to trigger the activation of the trap, and it may therefore seem sensible to define the entire region outlined by the metal rim as the trigger region. However, because the effective trapping region decreases with increasing distance of the particle from the metal film, the outer edge of the trigger region should be slightly smaller than the outline of the circular hole in the metal film. Furthermore, a region of interest of the shape of a filled circle would not allow for multiple-particle trapping. The reason is simple: an additional particle can only be accepted into the trap by temporarily turning the trapping voltage off, while a particle that is already trapped would continuously trigger the reactivation of the trap (and thus preventing new particles from entering).

Figure 12:
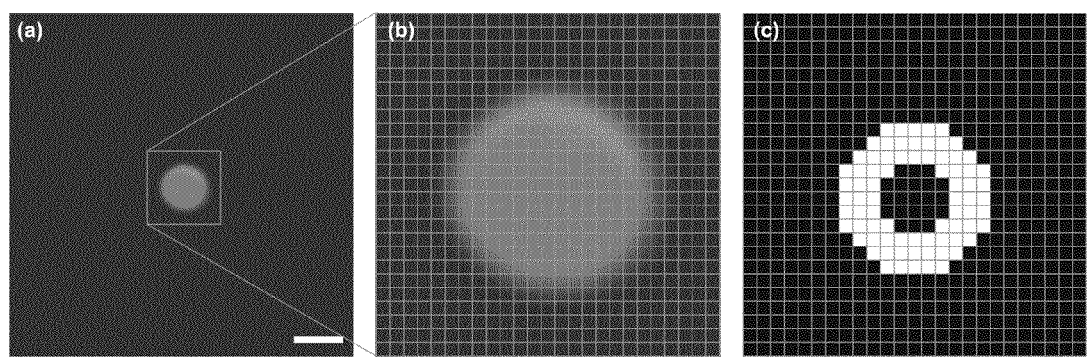
FIG. 12(a) shows an optical bright-field image of a corral trap created through shadow evaporation with 10 micron polystyrene beads (scale bar=10 microns)
FIG. 12(b) shows a zoom into the central 25×25 pixel area containing the trap.
FIG. 12(c) shows the corresponding mask array.

A donut-shaped trigger region such as shown in FIG. 12 solves this dilemma. FIG. 12(a) shows an optical bright-field image of a corral trap created through shadow evaporation with 10 micron polystyrene beads (scale bar=10 microns). FIG. 12(b) shows a zoom into the central 25×25 pixel area containing the trap and FIG. 12(c) shows the corresponding mask array. The opaque region corresponds to matrix elements containing "0"s, whereas the donut-shaped, transparent region (trigger region) corresponds to matrix elements of value "1".

The donut-shaped trigger region allows additional particles to enter the trap while the latter is turned off, and simultaneously prevents the already trapped particle(s) from constantly reactivating the trap and from escaping the trap. With a donut-shaped trigger region, the trap is reactivated by either one of the following two events: a trapped particle moves from the center of the trap into the trigger region, thereby preventing its escape, or an additional particle crosses from the outside into the trigger region, which leads to its trapping, increasing the number of trapped particles by one.

Various features and advantages of the invention are set forth in the following claims.

What is claimed is:

1. A method of trapping a charged particle, comprising:
   providing a planar substrate having a conductive surface thereon, the conductive surface having at least one non-conductive region;
   applying a solution to the conductive surface, the solution comprising at least one charged particle;
   electrically connecting one pole of a power source to the conductive surface, wherein the opposite pole of the power source is not connected to the conductive surface or to the solution;
   charging the conductive surface by applying a voltage of a threshold level to the conductive surface using the power source;
   in response to the voltage, generating an electrostatic field in the solution adjacent to a boundary between the conductive surface and the non-conductive region; and
   setting the threshold level of voltage to result in a strength of the electrostatic field sufficient to prevent the particle from crossing the electrostatic field wherein the voltage applied to the conductive surface has the same polarity as the at least one charged particle.

2. The method of claim 1, wherein the step of providing a planar substrate includes forming the non-conductive region as a closed geometric shape.

3. The method of claim 1, wherein the step of providing a planar substrate includes forming the non-conductive region as a circle.

4. The method of claim 3, wherein the circle has a radius; and wherein the step of applying a solution to the conductive surface includes limiting a thickness of the solution to no more than one-fifth of the radius.

5. The method of claim 1, wherein the step of providing a planar substrate includes forming the non-conductive region as a closed geometric shape; wherein the step of generating an electrostatic field includes defining the electrostatic field around the closed geometric shape to form an electrostatic well within the closed geometric shape; the method further comprising trapping the charged particle within the electrostatic well.

6. The method of claim 5, wherein applying a voltage includes setting the threshold level to limit movement of the charged particle within the electrostatic well to a degree sufficient for analyzing the charged particle; the method further comprising analyzing the charged particle while the charged particle is trapped within the electrostatic well.

7. The method of claim 1, wherein the charged particle is characterized by a polarity; and wherein the step of applying a voltage includes applying a voltage having a polarity equal to that of the charged particle.

8. The method of claim 1, further comprising forming in the substrate a microfluidic channel; wherein the step of applying a solution includes causing the solution to flow within the microfluidic channel; and wherein the step of setting the threshold level of voltage includes setting the threshold level of voltage to result in a strength of the electrostatic field sufficient to prevent the particle from crossing the electrostatic field under the influence of the flow of solution.

9. A method of trapping a charged particle, comprising:
   providing a planar substrate having a conductive surface thereon, the conductive surface having a circular non-conductive region;
   applying a solution to the conductive surface, the solution comprising at least one charged particle, wherein the solution has a thickness equal to no more than one-fifth of the radius of the circle;
   electrically connecting one pole of a power source to the conductive surface, wherein the opposite pole of the power source is not connected to the conductive surface or to the solution; and
   charging the conductive surface by applying a voltage to the conductive surface using the power source such that an electrostatic field is generated in the solution adjacent to a boundary between the conductive surface and the non-conductive region, wherein if the at least one charged particle is within the circle when the voltage is applied, the at least one charged particle is trapped within the circle,
   wherein the voltage applied to the conductive surface has the same polarity as the at least one charged particle.

10. The method of claim 9, wherein the charged particle comprises a bead or a DNA molecule.

* * * * *